3,087,974
PROCESS FOR MAKING HALOGENATED ORGANIC COMPOUNDS
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Apr. 11, 1960, Ser. No. 21,112
24 Claims. (Cl. 260—653)

This invention relates to a catalytic process for the disproportionation and rearrangement of perfluorochloroethanes.

The perfluorochloroethanes (i.e. ethanes containing only the elements chlorine, fluorine and carbon) are widely used as refrigerants, heat transfer fluids, dielectric fluids, aerosol propellants and the like. Commercially, perfluorochloroethanes are usually prepared by the fluorination of chlorinated ethanes with anhydrous hydrogen fluoride in the presence of fluorine containing metal salts, such as antimony chlorofluorides.

A disadvantage of such prior processes is that both the hydrogen fluoride and the catalyst employed are highly corrosive and require special equipment and handling precautions. As the fluorination proceeds from the lower to the more highly fluorinated ethanes, it is necessary to employ more and more drastic conditions to introduce additional fluorine, still further increasing the corrosion and handling problems. Another drawback is the necessity of separating hydrogen fluoride from the products following the fluorination reaction. There is accordingly a distinct need for a method of preparing perfluorochloroethanes, particularly those of higher fluorine content under less drastic, less corrosive and more convenient conditions.

There is also need for a convenient process for rearranging perfluorochloro ethanes into different isomeric forms, e.g. the rearrangement of $CClF_2CCl_2F$ into $CCl_3CF_3$. Such isomers often differ significantly from one another in chemical properties. The asymmetric forms (unsymmetrical distribution of fluorine and chlorine) for example are usually easier to fluorinate further. Usually, however, the symmetrical forms are produced solely or in predominant yield in fluorination reactions and it is thus desirable to have an efficient and economical process for converting the symmetrical to the asymmetrical form.

In accordance with the present invention, a simple, efficient vapor phase catalytic process has been discovered, which substantially eliminates the handling of corrosive materials, by which perfluorochloroethanes may be rearranged, or converted through disproportionation reactions, into a more highly fluorinated state. In its general aspects, the process of the invention involves contacting a perfluorochlorethane having at least one fluorine atom and at least one chlorine atom with a specially treated activated alumina catylst in the vapor phase at a temperature of 150° C. to 600° C. to produce ethanes different from the starting materials. As will appear from the subsequent description, the process of the invention has many advantages in addition to the elimination of the use of hydrogen fluoride and corrosive fluorine containing salts. Being a vapor-phase process, it is convenient to operate; high conversions and yields are obtainable, as well as long catalyst life. The catalyst employed is relatively cheap and convenient and easy to prepare.

The catalyst is prepared by treating activated alumina with a lower fluorocarbon (i.e. a fluorine containing carbon compound containing not more than one hydrogen atom) at an elevated temperature and continuing the treatment until the evolution of carbon dioxides has substantially ceased. During the course of such treatment, an exothermic reaction occurs accompanied by the evolution of carbon monoxide and/or carbon dioxide together in some cases with variable amounts of other products. When the evolution of carbon oxides has substantially ceased, the catayst is ready for use.

Activated alumina which is required in the preparation of the catalyst of the invention, is characterized, as is well recognized in the art, by its relatively high surface are as distinguished from non-activated forms such as corundum or alpha alumina which are dense, low-surface materials. Typically, activated aluminas may have surface areas ranging, e.g. from 10 to 300 square meters per gram.

As is well known, activated aluminas are generally prepared by the controlled dehydration or calcination of hydrated aluminas which may be natural or synthetic. Thus, for example, the controlled calcination of alpha alumina trihydrate or beta alumina trihydrate will produce a highly porous structure having high internal surface area. The hydrated alumina starting material may be natural, such as bauxite, or synthetically prepared such as by the precipitation of aluminum nitrate, aluminum sulfate or other soluble aluminum salt to produce a hydrated alumina gel which is then washed and calcined under control temperature conditions to produce the activated form.

It is highly preferred to employ essentially unmodified activated alumina, that is an activated alumina which contains at the most small amounts, e.g. one to two percent, of other materials (other than inert residues such as carbon from binders and the like). Desirably, the alumina should be low in $Na_2O$ and $Fe_2O_3$. Although essentially unmodified activated alumina is preferred, in some case it may prove desirable to employ an activated alumina containing minor amounts, e.g. from one to twenty percent, of other metals or metal oxides, such as chrominum oxide, cobalt oxide, molybdenum oxide and the like. The presence of such metals or metal oxides will often modify the selectivity and/or activity of the catalyst in a given reaction.

The lower fluorocarbons used in the treatment of the activated alumina are relatively low molecular weight fluorine containing carbon compounds usually not containing more than about 8 carbon atoms and preferably of the order of from 1 to 4 carbon atoms. The treatment of the activated alumina with the fluorocarbon to produce the catalyst should be conducted in the vapor phase and it is generally impractical therefore to employ higher molecular weight fluorocarbons which are difficult or impracticable to handle in the vapor phase.

As pointed out above, the fluorocarbon employed for the preparation of the catalyst should not contain more than one hydrogen atom. Apparently, the presence of multiple hydrogen atoms in the molecule interferes with the activation reaction. Thus, for example when the fluorine containing compound $CH_3CF_2Cl$ is passed over activated alumina at a temperature of about 300° C., reaction apparently does occur as evidenced by the evolution of $H_2O$ and $CH_2=CClF$. Carbon oxides, however, are not evolved and the alumina so treated, when tested as a catalyst in the disproportionation or rearrangement of perfluorochloroethanes shows essentially no activity.

Preferred fluorocarbons for the treatment of the activated alumina to produce the catalyst are those which in addition to carbon and fluorine contain only elements selected from the class consisting of chlorine and hydrogen, particularly fluoroalkanes of this type. Thus, included in this group are perfluorocarbons (i.e. containing only fluorine and carbon), perfluorochlorocarbons (i.e. containing only carbon, fluorine and chlorine); perfluorohydrocarbons (i.e. containing only carbon, fluorine and hydrogen); and perfluorochlorohydrocarbons (i.e. containing only carbon, fluorine, chlorine and hydrogen); provided always that not more than one hydrogen atom is present in the molecule.

Particularly preferred are the lower perfluorochloroalkanes (i.e. alkanes containing only the elements carbon, fluorine and chlorine). Desirably, the perfluorochloroalkanes employed should have one to six and preferably from one to three carbon atoms. Such compounds have been found to impart high activity to the catalysts, are readily available, and relatively cheap, particularly the perfluorochloroalkanes containing one and two carbon atoms.

Specific examples of fluorocarbons suitable for the treatment of the activated alumina are $CF_2ClCFCl_2$; $CF_3CCl_3$; $CF_2ClCF_2Cl$; $CF_3CFCl_2$; $CFCl_2CFCl_2$; $CF_2ClCCl_3$; $CF_2Cl_2$; $CF_3Cl$; $CFCl_3$; $CF_2HCl$; $CF_3CFClCF_2Cl$; $C_3Cl_3F_5$;

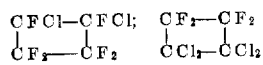

$CF_3H$ and $CF_3CF=CF_2$.

In the preparation of the catalyst, before treatment with the fluorocarbon, it is desirable first to dry the alumina to remove adsorbed moisture. This may be accomplished by heating the activated alumina to a temperature of e.g. 300° to 600° C., preferably 350° to 550° C. for a sufficient time to insure the elimination of any free water, e.g. from 5 minutes to 5 hours. Desirably, during the drying operation, the activated alumina is swept with a stream of an inert gas such as nitrogen.

The treatment of the activated alumina with the fluorocarbon is carried out in the vapor phase at elevated temperatures usually ranging from about 150° C. to 800° C. and preferably from 200° C. to 500° C. In most cases, particularly with the fluorochlorocarbons having from 1 to 3 carbon atoms, the optimum activation temperature, giving catalysts of optimum activity, will range from about 250° C. to 450° C.

An exothermic reaction occurs between the fluorocarbon and the alumina as evidenced by a rise in temperature in the catalyst bed. The minimum temperature at which such a reaction may be initiated will vary depending upon the fluorocarbon employed. Reaction may be initiated at temperatures as low as 150° F. with materials such as $CF_2HCl$ whereas with materials such as $CF_2Cl_2$ or $CF_2ClCFCl_2$, minimum temperatures of about 200° C. are required to initiate the reaction. In other cases, still higher temperatures may be required to initiate reaction.

The maximum temperature during the activation treatment should not exceed about 800° C. to avoid damage to the catalyst. Indeed, in order to avoid reduction of activity, the catalyst should not be permitted to remain at temperatures above about 500° C. for substantial periods of time during the activation treatment. Thus, while temperatures of the order of 600 to 800° C. for a few minutes resulting e.g. from the exotherm of the reaction may be tolerated, longer periods at these high temperatures may damage the catalyst.

The principal gaseous reaction products during the activation treatment are carbon oxides. These may be in the form of carbon monoxide, carbon dioxide or both and/or in the form of carbon oxide addition products, particularly $COCl_2$ and/or $COClF$. It is understood that the term carbon oxide is intended to include such addition products as well as carbon dioxide and carbon monoxide. Other products such as chlorocarbons, e.g. tetrachloroethylene, carbon tetrachloride, chloroform, and chlorofluoroalkanes may also be produced.

Where the treatment of the activated alumina with the fluorocarbon is carried out in a fixed bed, the reaction appears to proceed from the input to the exit of the bed as evidenced by the appearance of a hot zone which travels down the bed in the direction of the gas flow. This hot zone results from the rather strong exothermicity of the activation reaction and care should be taken to avoid the excessive temperatures in the hot zone where apparently most of the reaction is taking place. As pointed out above maximum bed temperatures in excess of about 800° C. should be avoided, and for best results, the catalyst bed temperatures should not be permitted to remain above about 500° C. for substantial periods of time. The maximum temperature reached in the hot zone will depend upon the initial catalyst bed temperature, the temperature and rate of flow of the activating fluorocarbon, the bed dimensions and the like. In order to control maximum bed temperatures during the activation treatment it may be desirable to dilute the fluorocarbon vapors employed for the activation with an inert gas such as nitrogen in order to moderate the exothermicity of the reaction and/or to employ means such as cooling tubes inserted in the catalyst bed in order to remove the heat of reaction during the course of the activation treatment.

Completion of the activation treatment is signaled by a sudden drop or substantial cessation of the generation of carbon oxides. The generation of carbon oxides may continue subsequently during the use of the catalyst, but the rate of generation is very low relative to the rate of generation during the activation treatment. In fixed bed operations, the completion of the activation may also be observed by the hot zone reaching the exit end of the bed. Depending on the activating agent, the initiation of the activation reaction may occur at a temperature lower than that required to fully activate the catalyst. In such cases it may be necessary or desirable to successively raise the activation temperature (but not above about 800° C.) until the evolution of carbon oxides has substantially ceased.

The time required to complete the activation will depend somewhat upon the temperature employed, the catalyst size, the length and other dimensions of the catalyst bed and the like. Typical activation times under normal conditions may range e.g. from 5 minutes to 5 hours.

During the activation procedure, fluorine derived from the activating fluorocarbon is apparently "fixed" in the activated alumina which shows a weight increase (dry basis) during the activation procedure generally ranging from 1% to 40%, and more usually from about 3% to 20%. During subsequent use, the catalyst may continue to show a very gradual additional increase in weight.

The pressure during the activation treatment is not critical except in the sense that the treatment should be carried out in the vapor phase and accordingly super-atmospheric pressures sufficiently high to cause condensation of the reactants or reaction products on the catalyst at the operating temperature employed should be avoided. While atmospheric pressure operation will often be most convenient and economical, sub-atmospheric and moderate super-atmospheric pressures ranging e.g. from one-tenth of an atmosphere to ten atmospheres may be sometimes desirable.

The remarkable catalytic activity of these catalysts for the disproportionation and rearrangement of perfluorochloroethanes is not entirely understood. They have considerably higher activity for such reactions than previously known catalysts containing aluminum and fluorine, such as aluminum fluoride prepared e.g. by the fluorination of $AlCl_3$ or alumina with hydrogen fluoride. Apparently, the aluminum and the fluorine in the catalyst of the invention are associated in a different manner than in these prior catalysts.

Aside from their simplicity of preparation and mode of use, these catalysts also have the advantage of relatively long life, having been found to be still very active after several hundred hours of operation. When after prolonged operation the activity of the catalyst begins to decline, it is apparently the result of the gradual deposition of carbon. When this occurs the activity of the catalyst can be readily restored by a relatively simple regeneration procedure involving the passage of oxygen or oxygen containing gases (e.g. air) over the catalyst at temperatures e.g. from 300–800° C. and preferably 350° to 500° C. This results in the oxidation of the deposited carbon restoring the catalyst to essentially its original activity. Excessive temperatures should be avoided during the regeneration procedure so as to avoid damaging the catalyst.

The following examples illustrate the preparation of catalysts useful in the process of the invention:

EXAMPLE A

An activated alumina was employed in the form of ⅛″ x ⅛″ cylindrical pellets containing over 99% ($H_2O$ free basis) of alumina and low in sodium, iron and silica (0.03% $Na_2O$; 0.08% $Fe_2O_3$; 0.22% $SiO_2$). Before drying it has a 26% weight loss on ignition at 1000° C. and a surface area of 231 square meters per gram.

The above activated alumina was dried by heating to 500° C. while sweeping with nitrogen for about one hour resulting in the loss of 9.7% by weight of water, based on dry weight.

After drying, the activated alumina, in an electrically heated tube was treated with $CF_2ClCFCl_2$ vapors at a space velocity of 180 volumes of $CF_2ClCFCl_2$ vapor (at standard conditions of temperature and pressure) per hour per volume of alumina for a period of 0.8 hour. The bed was maintained at an average temperature of about 300° C. during the treatment. At the outset a hot zone approximately 50° C. hotter than the average bed temperature formed at the inlet to the bed and moved progressively down the bed toward the exit as the activation treatment proceeded. Bed temperatures were measured in this and succeeding examples by thermocouples placed in an external longitudinal slot in the heated tube.

During the activation treatment the principal products were a mixture of carbon dioxide and carbon monoxide in the ratio of about 2:1 together with smaller amounts of tetrachloroethylene. At the end of about 0.8 hour, the evolution of carbon oxides suddenly ceased simultaneously with the appearance of the hot zone at the exit end of the bed. During this treatment the activated alumina increased in weight by about 16%, based on dry weight.

EXAMPLE B

An activated alumina of the type used in Example A in the form of ⅛″ x ⅛″ cylindrical pellets was heated in a fixed bed to 500° C. for 1 hour in a stream of nitrogen. The bed was then cooled to about 260° C. A stream of nitrogen was bubbled through liquid $CF_2ClCFCl_2$ at about −10° C. and this stream of nitrogen-diluted $CF_2ClCFCl_2$ was then passed through the bed at a space velocity (based upon $CF_2ClCFCl_2$) of about 50 volumes of $CF_2ClCFCl_2$ vapor per volume of alumina per hour. Under these conditions a mild exotherm was noted in the bed, the temperature rising approximately 25° C. over the initial bed temperature of 260° C. As the treatment continued, the hot zone of the bed moved progressively down stream toward the exit. The product gases from the activation treatment were principally carbon dioxide and carbon monoxide in the ratio of approximately 2:1 with lesser amounts of tetrachloroethylene. The completion of the activation was shown by the sudden virtual cessation of generation of CO and $CO_2$ and by the appearance of the hot zone at the exit of the bed.

EXAMPLE C

Activated alumina of the type used in Example A in the form of ⅛″ x ⅛″ pellets was heated to 500° C. for 1.3 hours while sweeping with nitrogen, driving off 10% by weight of water. A stream of vapors of $CF_3CFCl_2$ were then passed through the bed at a space velocity of 170 volumes of $CF_3CFCl_2$ (at standard conditions) per volume of alumina per hour while maintaining the average bed temperature at about 400° C. Vigorous reaction occurred, a hot zone moving down the bed as previously described, the temperature at the hot zone rising at some points to a maximum of 450° C. The principal gaseous products of the activation were carbon monoxide and carbon dioxide in the ratio of 1:2 at the start falling to 1:4 near the end. Activation was complete in 1.5 hours.

EXAMPLE D

Activated alumina of the type employed in Example A in the form of cylindrical ⅛″ x ⅛″ pellets was heated for 500° C. for 1 hour while sweeping with nitrogen, driving off 9.8% of water. The bed temperature was reduced to 300° C. and at this temperature a stream of $CF_2ClCF_2Cl$ vapors was passed through the bed at a space velocity of 200 volumes of $CF_2ClCF_2Cl$ per volume of alumina per hour. Activation treatment was continued under these conditions for 1.2 hours while the evolution of CO and $CO_2$ in the ratio of 1:2.5 as the principal gaseous products. After 1.2 hours the temperature was raised to 400° C.; activation was complete in 1.5 hours. Only a trace of tetrachloroethylene was formed during activation.

EXAMPLE E

Activated alumina in the form of ⅛″ x ⅛″ pellets containing precipitated chromium oxide was employed, analyzing as follows on an $H_2O$ free basis:

| | Percent |
|---|---|
| $Cr_2O_3$ | 19.7 |
| $Na_2O$ | 0.6 |
| $SiO_2$ | 0.15 |
| CuO | 0.005 |
| $Fe_2O_3$ | 0.08 |
| $Ni_2O$ | 0.005 |
| $Al_2O_3$ | Remainder |

A bed of this alumina was heated to a temperature of 500° C. while sweeping with nitrogen for 1 hour resulting in a weight loss of 0.9% $H_2O$. While maintaining the bed temperature at approximately 400° C., a stream of vapors of $CF_2ClCFCl_2$ was passed through the bed at a space velocity of 180 volumes of $CF_2ClCFCl_2$ (at standard conditions) per volume of alumina per hour. After about 1 hour, the generation of carbon oxides ceased and activation was complete.

The preparation of other suitable catalysts is described in the copending application of Murray Hauptschein and Arnold Fainberg Serial No. 18,505, filed March 30, 1960 for Catalyst Composition.

Catalysts prepared as described above are highly active for the conversion of perfluorochloroethanes having from 1 to 5 fluorine atoms into more highly fluorinated ethanes through disproportionation reactions. Such disproportionation reactions may be represented by the following equations:

Equation (1)
$$2C_2Cl_5F \rightarrow C_2Cl_4F_2 + C_2Cl_6$$

Equation (2)
$$2C_2Cl_4F_2 \rightarrow C_2Cl_3F_3 + C_2Cl_5F$$

Equation (3)
$$2C_2Cl_3F_3 \rightarrow C_2Cl_2F_4 + C_2Cl_4F_2$$

Equation (4)
$$2C_2Cl_2F_4 \rightarrow C_2ClF_5 + C_2Cl_3F_3$$

Equation (5)
$$2C_2ClF_5 \rightarrow C_2F_6 + C_2Cl_2F_4$$

The conversion of perfluorochloroethanes having 3 and 4 fluorine carbon atoms to those having 4 and 5 fluorine atoms respectively is of particular interest since the fluorination of these compounds by conventional methods with hydrogen fluoride and a fluorine containing metal salt requires relatively drastic conditions and because these reactions are carried out in accordance with the invention in high conversions and yields.

The disproportionation reactions of the invention may occur between like molecules, for example between two molecules of $CF_2ClCFCl_2$ or two molecules of $CF_3CFCl_2$ as follows:

Equation (6)
$$2CF_2ClCFCl_2 \rightarrow C_2Cl_2F_4 + C_2Cl_4F_2$$

Equation (7)
$$2CF_3CFCl_2 \rightarrow C_2ClF_5 + C_2F_3Cl_3$$

On the other hand, mixed disproportionation reactions may occur between two isomers, or between two molecules of a different degree of fluorination. Examples of the foregoing are the following:

Equation (8)
$$CF_3CCl_3 + CF_2ClCFCl_2 \rightarrow C_2Cl_2F_4 + C_2Cl_4F_2$$

Equation (9)
$$CCl_3CClF_2 + CCl_2FCCl_3 \rightarrow C_2Cl_3F_3 + C_2Cl_6$$

Equation (10)
$$CF_3CCl_3 + CCl_2FCCl_2F \rightarrow C_2Cl_2F_4 + C_2Cl_5F$$

Equation (11)
$$CCl_3CF_3 + CCl_3CClF_2 \rightarrow C_2Cl_2F_4 + C_2Cl_5F$$

Equation (12)
$$CCl_3CF_3 + CCl_2FCCl_3 \rightarrow C_2Cl_2F_4 + C_2Cl_6$$

Equation (13)
$$CCl_2FCF_3 + CClF_2CCl_2F \rightarrow C_2ClF_5 + C_2Cl_4F_2$$

Equation (14)
$$CCl_2FCF_3 + CCl_2FCCl_2F \rightarrow C_2ClF_5 + C_2Cl_5F$$

Equation (15)
$$CCl_2FCF_3 + CCl_3CClF_2 \rightarrow C_2ClF_5 + C_2Cl_5F$$

Equation (16)
$$CCl_2FCF_3 + CCl_2FCCl_3 \rightarrow C_2ClF_5 + C_2Cl_6$$

In addition to the disproportionation reactions mentioned above, rearrangement reactions may be also carried out in accordance with the invention, in accordance with which molecules that are symmetrically arranged with respect to the distribution of chlorine and fluorine are converted to asymmetric forms. Typical of such rearrangement reactions are the following:

Equation (17)
$$CF_2ClCFCl_2 \rightarrow CF_3CCl_3$$

Equation (18)
$$CF_2ClCF_2Cl \rightarrow CF_3CFCl_2$$

It is to be understood that the various rearrangement and disproportionation reactions described above may often proceed simultaneously. For example, when $C_2Cl_4F_2$ is passed over the catalyst in accordance with the invention it will disproportionate to $$C_2Cl_3F_3(+C_2Cl_5F)$$

and the $C_2Cl_3F_3$ may then disproportionate to the next higher fluorinated ethane $C_2Cl_2F_4(+C_2Cl_4F_2)$. Likewise, when $CF_2ClCFCl_2$ is treated in accordance with the invention, rearrangement to $CF_3CCl_3$ and mixed disproportionation between $CF_2ClCFCl_2$ and the rearrangement product $CF_3CCl_3$ occurs simultaneously together with disproportionation of $CF_2ClCFCl_2$ with itself and of $CF_3CCl_3$ with itself.

The various rearrangement and disproportionation reactions undergone by the perfluorochloroethanes in accordance with the invention occur at different rates depending upon the reaction temperature and other conditions and thus, by controlling the reaction conditions, e.g. temperature, a desired disproportionation and/or rearrangement reaction may be caused to predominate. In general, better conversions to disproportionation products higher in fluorine content are obtained at higher temperatures.

Rearrangement activity versus disproportionation activity is also somewhat temperature dependent and depends also upon the choice of a particular catalyst among those embraced within the scope of the invention. Thus, a chromium modified catalyst may be employed to minimize rearrangement activity, in the event that predominantly disproportionation is desired, as will be illustrated in the examples which follow.

Because of the ease with which the perfluorochloroethanes of lower fluorine content disproportionate to produce ethanes of still lower fluorine content (see Equations 1 and 2 above), the ultimate reaction products will often include perchloroethane $C_2C_6$ (or $CCl_2=CCl_2+Cl_2$ resulting from splitting off of $Cl_2$ from $C_2Cl_6$) even in cases where the starting materials are relatively highly fluorinated ethanes such as $C_2F_3Cl_3$ or $C_2F_4Cl_2$. This results from additional step-wise disproportionation reactions occurring simultaneously with the primary disproportionation.

The process of the invention is carried out by passing the reactants in the vapor phase desirably with the exclusion of moisture and oxygen through the catalyst bed at catalyst bed temperatures of from 150° to 600° C. and preferably from 225° C. to 450° C. The reactants may be preheated approximately to the desired catalyst bed temperature before passing over the catalyst. In some cases, the reactions involved are somewhat exothermic and it may be desirable in such cases to preheat the reactants to a temperature somewhat below the desired equilibrium catalyst temperature.

The factors governing the minimum catalyst temperature of about 150° C. are reaction rate and the tendency of high boiling products or reactants to condense on the catalyst. Generally speaking, at temperatures below about 150° C., the disproportionation and rearrangement reactions of the invention do not proceed at practical rates. Likewise, at temperatures below 150° C. it becomes difficult to avoid the condensation of high boiling compounds such as perchloroethylene or perchloroethane which tends to inactivate the catalyst.

At temperatures above about 600° C. the catalyst life is shortened and there is also a tendency for the reactants and the reaction products to undergo thermal cracking to olefins and/or methanes. In most cases, optimum results are obtained in the preferred range of 225° C. to 450° C.

Reaction pressure is not critical except in the sense that the reactants and the reaction products should be maintained in the vapor phase while in contact with the catalyst bed, and accordingly, super-atmospheric pressures sufficiently high to cause condensation of the reactants or reaction products on the catalyst at the operating temperature employed should be avoided. While atmospheric pressure operation will often be most convenient and economical, sub-atmospheric and moderate super-atmospheric pressures ranging, e.g. from one-tenth of an atmosphere to ten atmospheres may sometimes be found desirable.

The rate of flow of the reactants over the catalyst is not critical and may vary within wide limits, depending on the reaction temperature, desired conversion, and other operating conditions. In most cases, practical flow rates will lie within the range of from one hundred to ten thousand volumes of reactant vapor (calculated at 0° C. and 760 mm. Hg) per volume of catalyst (bulk volume) per hour. At these flow rates, the reaction time (catalyst contact time) will vary from a fraction of a second to about a minute.

The reaction products and unreacted starting materials leaving the catalyst bed may in most cases be condensed by cooling and/or compression to form a liquid one-phase mixture from which the desired reaction products may be separated by ordinary fractional distillation and the unreacted starting material then recycled to the catalyst bed. Perchlorinated materials or low fluorine content materials such as $C_2Cl_6$, $C_2Cl_4+Cl_2$, $C_2Cl_5F$ and $C_2Cl_4F_2$ may if desired, be treated by conventional means such as by HF fluorination in the presence of fluorine containing metal salts, to upgrade them to fluorine containing ethanes to be used as starting materials in the process of the invention. The fractional distillation of the product mixtures produced in accordance with the invention is facilitated by the fact that hydrogen fluoride is not used or produced in the process and thus does not appear as a difficult-to-remove contaminant in the reaction products.

*Catalytic Rearrangement and Disproportionation Reactions Starting With $CF_2ClCFCl_2$*

The catalytic treatment of the symmetrically fluorochlorinated ethane $CF_2ClCFCl_2$ is a preferred embodiment of the invention. The principal reactions apparently occurring when this compound is treated in accordance with the invention are the following:

Equation (17)
$$CF_2ClCFCl_2 \rightarrow CF_3CCl_3 \text{ (rearrangement)}$$

in accordance with the invention. In each of these examples, the catalyst employed consists of about 172 grams of ⅛″ x ⅛″ cylindrical pellets of activated alumina prepared as described in Example A by drying and then treating with $CF_2ClCFCl_2$ at a temperature of 300° C. until the evolution of CO and $CO_2$ has substantially ceased.

The catalyst is contained in a cylindrical 15/16 inch I.D. electrically heated tube to provide a catalyst mass 15/16 inch in in diameter and 15 inches long. Liquid $$CF_2ClCCl_2F$$

is metered via a needle valve through a flow meter and a flash vaporizer to the reactor input. The reactor exit gases are led to a Dry-Ice cooled receiver where the total product is collected. The total produce analyses are carried out using Vapor Fractometer and infrared techniques. The temperatures reported are average catalyst bed temperatures measured with several thermocouples placed in an external longitudinal slot in the tube.

The results of eleven runs in which the catalyst temperature varied from 250° C. to 400° C. are summarized in Table I.

TABLE I

| Ex. No. | Temp. °C. | Space velocity per hour | Product composition, mole percent ||||||||| $CF_3Cl_3$ plus $CF_3CFCl_2$ plus $CF_2ClCF_2Cl$ |
|---|---|---|---|---|---|---|---|---|---|---|---|---|
| | | | $CF_3CF_2Cl$ | $CF_3CFCl_2$ | $CF_2ClCF_2Cl$ | $CF_3CCl_3$ | $CF_2ClCFCl_2$ | $CF_2ClCCl_3$ [a] | $CFCl_2CCl_3$ | $C_2Cl_4$ | $C_2Cl_6$ | |
| 1 | 250 | 345 | 0.1 | 20.0 | 0.8 | 50.1 | 14.1 | 12.2 | 1.5 | 0.5 | 0.7 | 71 |
| 2 | 275 | 350 | 0.4 | 21.4 | 1.1 | 48.1 | 12.8 | 12.4 | 2.1 | 0.8 | 0.1 | 71 |
| 3 | 300 | 175 | 1.0 | 20.8 | 1.8 | 54.9 | 6.1 | 9.9 | 2.6 | 1.3 | 1.6 | 78 |
| 4 | 300 | 355 | 0.7 | 21.9 | 1.8 | 47.9 | 10.5 | 12.5 | 2.5 | 1.2 | 1.1 | 72 |
| 5 | 300 | 700 | 0.5 | 21.0 | 1.6 | 41.7 | 18.7 | 12.7 | 2.0 | 0.6 | 1.2 | 64 |
| 6 | 300 | 1,280 | 0.4 | 19.6 | 1.0 | 31.8 | 33.1 | 11.9 | 1.3 | 0.6 | 0.3 | 52 |
| 7 | 350 | 350 | 2.3 | 23.1 | 2.8 | 46.1 | 8.1 | 10.7 | 2.8 | 2.7 | 1.5 | 72 |
| 8 | 350 | 690 | 1.7 | 23.2 | 2.6 | 42.7 | 12.0 | 11.4 | 2.6 | 2.6 | 1.1 | 69 |
| 9 | 350 | 1,230 | 1.1 | 22.8 | 2.2 | 38.7 | 18.2 | 12.1 | 2.2 | 0.8 | 1.9 | 64 |
| 10 | 400 | 680 | 3.6 | 25.1 | 3.6 | 39.3 | 8.0 | 10.7 | 2.7 | 5.7 | 1.3 | 68 |
| 11 | 400 | 1,230 | 2.3 | 24.6 | 3.4 | 39.2 | 14.0 | 11.4 | 2.5 | 4.7 | 0.9 | 64 |

[a] Contains less than 10% of $CFCl_2CFCl_2$.

Equation (8)
$$CF_3CCl_3 + CF_2ClCFCl_2 \rightarrow C_2Cl_2F_4 + C_2Cl_4F_2$$
(disproportionation)

Equation (6)
$$2CF_2ClCFCl_2 \rightarrow C_2Cl_2F_4 + C_2Cl_4F_2$$
(disproportionation)

Equation (7)
$$2CF_3CCl_3 \rightarrow C_2Cl_2F_4 + C_2Cl_4F_2$$
(disproportionation)

There is also further disproportionation of the $C_2F_4Cl_2$ compounds formed in situ to form the next higher fluorinated ethane in accordance with the following reaction:

Equation (4)
$$2C_2F_4Cl_2 \rightarrow C_2F_5Cl + C_2Cl_3F_3$$

Finally, the lower fluorinated ethanes formed in situ likewise undergo further disproportionation to form $C_2Cl_5F$ and, $C_2Cl_6$, while $C_2Cl_6$ may split off chlorine in accordance with the following reactions:

Equation (2)
$$2C_2Cl_4F_2 \rightarrow C_2Cl_3F_3 + C_2Cl_5F$$

Equation (1)
$$2C_2Cl_5F \rightarrow C_2Cl_6 + C_2Cl_4F_2$$

Equation (19)
$$C_2Cl_6 \rightarrow CCl_2=CCl_2 + Cl_2.$$

EXAMPLES 1 TO 11

The following examples 1 to 11 illustrate the above reactions occurring during the catalytic treatment of $$CF_2ClCFCl_2$$

As is apparent from the data in Table I, the major product in each case is $CF_3CCl_3$ produced by the rearrangement of the initial reactant $CF_2ClCCl_2F$ in accordance with Equation 17. The second major product is $C_2Cl_2F_4$ (generally more than 90% of the isomer $CF_3CFCl_2$) produced by disproportionations in accordance with Equations 8, 6 and 7. Small amounts of $CF_3CF_2Cl$ are produced in accordance with Equation 4 by the disproportionation of the $C_2Cl_2F_4$ produced in situ. Substantial amounts of $C_2Cl_4F_2$ are produced through the disproportionations in accordance with Equations 8 and 6 while further disproportionation of $C_2Cl_4F_2$ in accordance with Equations 2 and 1 produces small amounts of $CFCl_2CCl_3$ and $C_2Cl_6$. The $C_2Cl_6$ dissociates in accordance with Equation 19 to produce small amounts of chlorine and $C_2Cl_4$.

It will be noted that as the temperature increases, the conversion to $CF_3CCl_3$ decreases (maximum at temperatures of the order of 300° C.) while the conversion of $C_2Cl_2F_4$ increases. Increasing temperature also favors the conversion to $C_2ClF_5$.

Where a maximum yield of $CF_3CCl_3$ is desired, best results are generally obtained in the range of from 250° to 325° C. average catalyst temperature and most desirably in the range of 270° to about 300° C. The following example illustrates the operation of the process under these conditions over an extended period of time and demonstrates the sustained high activity of the catalyst.

EXAMPLE 12

Liquid $CF_2ClCCl_2F$ is fed to a vaporizer and pre-heater where it is vaporized and preheated to a temperature of 230° C. and then passed through a bed of ⅛″ x ⅛″ catalyst pellets of activated alumina treated as described in Example B by passing a stream of $CF_2ClCFCl_2$ in nitrogen over the activated alumina pellets at a temperature of 300° to 350° C. until the evolution of carbon oxides has ceased. The total weight of the catalyst is about 215 grams supported in a stainless steel tube having an inside diameter of 1 inch to provide a catalyst bed 1 inch in diameter and 17 inches long. The average catalyst temperature was maintained at 285° ∓15° C. throughout the run while the space velocity averaged at about 500 volumes of $CF_2ClCCl_2F$ per volume of catalyst per hour. Operating continuously during a period of fifteen days under these conditions, the conversion to $CF_3CCl_3$ is 56% initially and 53% at the end of this period. Conversion to $C_2F_4Cl_2$ (mostly $CF_3CFCl_2$) during the run holds steady at about 20%. Total conversion to $CF_3CCl_3$ and $C_2F_4Cl_2$ during the run averages about 75%. Only traces of $CF_3CF_2Cl$ are obtained, while an average of about 12% $C_2Cl_4F_2$; about 3% $C_2Cl_5F$; about 1% $C_2Cl_6$, and about 3% $CCl_2$=$CCl_2$ are obtained. During this run a total of 720 pounds of $CF_2ClCCl_2F$ is passed over the catalyst (1500 pounds of $CF_2ClCCl_2F$ per pound of catalyst). At the end of this run the catalyst is still highly active.

EXAMPLE 13 (CATALYST REGENERATION)

A spent catalyst deactivated after prolonged operation in the disproportionation and rearrangement of $CF_2ClCFCl_2$ as described in Examples 1 to 12 is regenerated as follows:

A spent catalyst (210 grams) dark gray to black in color as a result of carbon deposited on the catalyst is regenerated by passing oxygen through the catalyst bed at 100 to 150 milliliters per minute while the catalyst temperature is raised from 300° C. to 400° C. over a period of 18 hours. At 300° C. only a trace of $CO_2$ is detected. At 400° C. 25% $CO_2$ is found in the exit gas initially, this falling off slowly, 10% being measured after two hours and virtually nothing after a total of eighteen hours.

Tests of the catalyst activity for the rearrangement and disproportionation of $CF_2ClCFCl_2$ before and after regeneration are made in accordance with the procedures of the foregoing examples and the results of these tests are summarized in Table II below:

TABLE II

|  | Temp., ° C. | Space velocity per hour | Mole percent conversion to $CF_3CCl_3$ | Mole percent conversion to $C_2Cl_2F_4$ | Mole percent conversion to $CF_3CCl_3$ plus $C_2Cl_2F_4$ |
|---|---|---|---|---|---|
| Before regeneration | 300 | 360 | 36 | 22 | 58 |
|  | 300 | 720 | 27 | 15 | 42 |
| After regeneration | 300 | 360 | 54 | 24 | 78 |
|  | 300 | 720 | 44 | 25 | 69 |

As may be seen, the activity of the catalyst, particularly for the rearrangement reaction, is very substantially increased, the catalyst being restored close to its initial activity.

When the catalyst was regenerated at a temperature of 450° C. in the same manner and tested in the disproportionation of $C_2Cl_2F_4$ the activity was found to have increased still further, and in this case the regenerated activity was greater than the activity of the catalyst when freshly prepared.

The above described process for the disproportionation and rearrangement of $CF_2ClCFCl_2$ may be advantageously combined with conventional fluorination processes such as fluorination with hydrogen fluoride in the presence of fluorine containing metal salts such as antimony chlorofluoride. When it is desired to produce mainly $CF_3CCl_3$ a suitable integrated process is as follows. The feed material $CF_2ClCFCl_2$ for the catalytic rearrangement and disproportionation reactor is produced in the usual way by feeding perchloroethylene, chlorine and hydrogen fluoride to a reactor containing antimony chlorofluoride, to produce $CF_2ClCCl_2F$ in known manner. The crude reaction mixture is passed through an HCl absorber, and is then washed and dried. The $CF_2ClCCl_2F$ produced is then catalytically treated in accordance with the invention under conditions to produce a maximum conversion to $CF_3CCl_3$. The crude product includes $C_2Cl_3F_3$ (usually more than 90% of the isomer $CF_2CCl_3$) plus $C_2Cl_2F_4$ (usually more than 90% of the isomer $CF_3CFCl_2$) as the major products; together with smaller amounts of $C_2Cl_4F_2$, $C_2CCl_5F$, $C_2Cl_6$ and traces of $C_2ClF_5$. Any $C_2Cl_4$ and chlorine produced may be recombined by irradiation to $C_2Cl_6$ so as to avoid handling these materials during subsequent treatment. This mixture is then condensed, neutralized and dried after which the crude dry product is fractionally distilled to separate $C_2Cl_3F_3$ and $C_2Cl_2F_4$ as the major products plus small amounts or traces of $C_2ClF_5$. The bottoms from the still consisting of the higher boiling more highly chlorinated materials $C_2Cl_4F_2$, $C_2Cl_5F$ and $C_2Cl_6$, are then recycled as feed to the fluorination reactor for conversion to $CF_2ClCCl_2F$ to supply additional feed to the disproportionation and rearrangement step. By this procedure, almost quantitative conversion of the starting $CF_2ClCCl_2F$ to e.g. 75% $C_2Cl_3F_3$ (usually more than 90% $CF_3CCl_3$) and 25% $C_2Cl_2F_4$ (usually more than 90% $CF_3CFCl_2$) may be obtained.

If it is desired to produce solely $C_2Cl_2F_4$, the following integrated process may be employed. The $CF_2ClCCl_2F$ feed to the catalytic disproportionation and rearrangement step is prepared as described above by the fluorination of perchloroethylene with HF. The $CF_2ClCCl_2F$ is then subjected to disproportionation and rearrangement in accordance with the invention to produce a crude product containing $C_2Cl_2F_4$ (usually more than 90% $CF_3CFCl_2$) and $C_2Cl_3F_3$ (usually more than 90% $CF_3CCl_3$) as the major products; some $C_2Cl_4F_2$, $C_2Cl_5F$, $C_2Cl_6$ and traces of $C_2ClF_5$. The crude product is washed and dried in the usual manner and then fractionally distilled to separate $C_2ClF_5$ and $C_2Cl_3F_4$ while the entire remaining product, including $C_2Cl_3F_3$ (mostly $CF_3CCl_3$) and low fluorine content disproportionation products $C_2Cl_4F_2$, $C_2Cl_5F$ and $C_2Cl_6$, is recycled to the fluorination reactor to be fluorinated. In the fluorination reactor, the $C_2Cl_4F_2$ and lower fluorine content material is fluorinated to $CF_2ClCFCl_2$. The rearrangement product $CF_3CCl_3$ is fluorinated to $CF_3CFCl_2$, while under the relatively mild fluorination conditions obtaining in the fluorination reactor, the symmetrical isomer $CF_2ClCFCl_2$ is not fluorinated.

In this cyclic process, the output of the fluorination reactor is $CF_2ClCFCl_2$ plus $CF_3CFCl_2$ produced by the fluorination of the rearrangement product $CF_3CCl_3$. The fluorination reactor output is distilled to separate the lower boiling $CF_3CFCl_2$ from the $CF_2ClCCl_2F$, the latter being fed into the disproportionation rearrangement reactor while the former is combined with the $CF_3CFCl_2$ product from the disproportionation-rearrangement reactor. By operating a process in this manner almost quantitative conversion of $CF_2ClCFCl_2$ to $C_2Cl_2F_4$ (usually more than 90% of the isomer $CF_3CFCl_2$) may be achieved while avoiding entirely the rigorous fluorination conditions that would be required to convert $CF_2ClCCl_2F$ directly to tetrafluorodichloroethane by direct fluorination. This results from the fact that the asymmetrical $CF_3CCl_3$ fluorinates much more readily than the symmetrical form $CF_2ClCFCl_2$, permitting the fluorination reactor to be operated under relatively mild conditions.

*Catalytic Rearrangement and Disproportionation Reactions Starting With $CF_3CFCl_2$*

The catalytic treatment of $CF_3CFCl_2$ is another preferred embodiment of the invention. The principal reaction occurring with this compound is treated in accordance with the invention is the following:

Equation (7)

$$2CF_3CCl_2F \rightarrow CF_3CClF_2 + C_2Cl_3F_3$$

Further disproportionation of the $C_2Cl_3F_3$ produced in situ occurs to some extent in accordance with Equation 3 and still further disproportionation to higher chlorine content ethanes may also occur in accordance with Equations 1 and 2. At high temperatures, disproportionation of $CF_3CF_2Cl$ to $C_2F_6$ may occur to a slight extent in accordance with Equation 5.

EXAMPLES 14 TO 20

The following examples illustrate the above reactions occurring during the catalytic treatment of $CF_3CFCl_2$ in accordance with the invention. In these examples 180 grams of ⅛″ x ⅛″ catalyst pellets is employed, the catalyst having been prepared as described in Example C by drying and then treating with $CF_3CFCl_2$ at a temperature of 400° to 450° C. until the evolution of carbon oxides has substantially ceased. The catalyst is contained in a cylindrical 15/16″ I.D. electrically heated tube to provide a catalyst mass 15/16″ in diameter and fifteen inches long. $CF_3CFCl_2$ is metered through a flow meter to the reactor input. The reactor exit gases are led to a cooled receiver where the product is collected and afterwards analyzed. The results of seven runs (Examples 14–20) at varying catalyst temperatures and space velocities are summarized in Table III below:

TABLE III

| Ex. No. | Temp., ° C. | Space velocity per hour | Mole percent conversion to $C_2F_5Cl$ + $C_2Cl_3F_3$ |
|---|---|---|---|
| 14 | 400 | 40 | 75 |
| 15 | 400 | 80 | 66 |
| 16 | 400 | 170 | 56 |
| 17 | 400 | 360 | 40 |
| 18 | 450 | 170 | 59 |
| 19 | 450 | 360 | 46 |
| 20 | 450 | 1,000 | 28 |

EXAMPLES 21 TO 24

The catalyst employed was prepared in the same manner as that used in Examples 14 to 20 except that the alumina was treated with $CF_3CFCl_2$ at a temperature of 300° C. rather than 400 to 450° C. The results of four runs (Examples 21 to 24) at 400° C. and varying space velocities are summarized in Table IV below:

TABLE IV

| Ex. No. | Temp., ° C. | Space velocity per hour | Mole percent conversion to $C_2F_5Cl$ plus $C_2Cl_3F_3$ |
|---|---|---|---|
| 21 | 400 | 40 | 80 |
| 22 | 400 | 80 | 76 |
| 23 | 400 | 170 | 64 |
| 24 | 400 | 360 | 45 |

*Catalytic Rearrangement and Disproportionation Reactions Starting With $CF_2ClCF_2Cl$*

The principal reactions occurring when the symmetrically fluorochlorinated ethane $CF_2ClCF_2Cl$ is treated in accordance with the invention are the following:

Equation (18) $CF_2ClCF_2Cl \rightarrow CF_3CFCl_2$ (rearrangement)
Equation (7)
$$2CF_3CFCl_2 \rightarrow CF_3CF_2Cl + C_2Cl_3F_3$$
(disproportionation)
Equation (20)
$$CF_2ClCF_2Cl + CF_3CFCl_2 \rightarrow CF_3CF_2Cl + C_2Cl_3F_3$$
(disproportionation)
Equation (21)
$$2CF_2ClCF_2Cl \rightarrow CF_3CF_2Cl + C_2Cl_3F_3$$
(disproportionation)

Apparently, the major reactions occurring are in accordance with Equations 18, 7 and 20; that is, the starting $CF_2ClCF_2Cl$ first rearranges and the rearrangement product $CF_3CFCl_2$ then disproportionates with itself and with $CF_2ClCF_2Cl$.

In addition to the above reactions there is also some further disproportionation of the lower fluorine content materials formed in situ to form still lower fluorine content ethanes in accordance with Equations 1, 2 and 3.

The following Examples 25–27 illustrate the catalytic rearrangement and disproportionation reactions of $CF_2ClCF_2Cl$.

EXAMPLES 25 TO 27

In each of these examples, the catalyst employed consists of about 165 grams of ⅛″ x ⅛″ pellets of activated alumina prepared as described in Example D by drying and then treating with $CF_2ClCF_2Cl$ at a temperature of from 300° C. to 400° C. until the evolution of CO and $CO_2$ has substantially ceased. The catalyst is contained in a cylindrical 15/16″ I.D. electrically heated tube to provide a catalyst mass 15/16″ in diameter and about 15 inches long. $CF_2ClCF_2Cl$ is metered through a flow meter to the reactor input. The reactor exit gases are led to a cooled receiver where the product is collected and afterwards analyzed. The results of three runs at a catalyst temperature of 400° C. and at varying space velocities are summarized in Table V below:

TABLE V

| Ex. No. | Temp., ° C. | Space velocity per hour | Mole percent conversion to $CF_3CF_2Cl$ | Mole percent conversion to $CF_3CFCl_2$ | Mole percent conversion to $CF_3CF_2Cl$ plus $CF_3CFCl_2$ | Total conversion of $CF_2ClCF_2Cl$ to products |
|---|---|---|---|---|---|---|
| 25 | 400 | 95 | 34 | 24 | 58 | 92 |
| 26 | 400 | 200 | 27 | 28 | 55 | 81 |
| 27 | 400 | 415 | 18 | 32 | 50 | 68 |

As may be seen, the conversion to $CF_3CF_2Cl$ is favored by lower space velocities (longer residence time).

Higher temperatures also tend to favor the conversion to $CF_3CF_2Cl$. Accordingly, where it is desired to produce predominantly $CF_3CFCl_2$ relatively low temperatures and short residence time should be employed, while relatively high temperatures and long residence time should be employed to favor the production of $CF_3CF_2Cl$. Where it is desired to produce exclusively $CF_3CF_2Cl$, the $CF_3CFCl_2$ may be recycled to the catalyst together with unreacted $CF_2ClCF_2Cl$.

*Catalytic Disproportionation of Mixtures of $CF_3CCl_3$ and $CF_2ClCFCl_2$*

Examples 28 and 29 illustrate the inter-molecular disproportionation between $CF_3CCl_3$ and $CF_2ClCFCl_2$ over a catalyst prepared from a chromia containing activated alumina. The reaction proceeds as follows:

Equation (8)

$$CF_3CCl_3 + CF_2ClCFCl_2 \rightarrow C_2Cl_2F_4 + C_2Cl_4F_2$$

Further disproportionation of the $C_2Cl_2F_4$ to $CF_3CF_2Cl$ occurs together with some disproportionation of the lower fluorine content materials to ethanes of still lower fluorine content as previously explained.

For the purpose of comparison the same catalyst was employed at the same space rate and similar temperatures to treat feed stocks consisting solely of $CF_2ClCFCl_2$ (Examples 30–32) and solely of $CF_3CCl_3$ (Examples 33 and 34).

In each of Examples 28–34 the catalyst employed consists of 183 grams of ⅛″ x ⅛″ activated alumina pellets containing about 20% $Cr_2O_3$. These pellets are treated as described in Example E by drying and then treating with $CF_2ClCFCl_2$ at a temperature of 400° C. until the evolution of carbon oxides substantially ceases.

The feed stock is metered via a needle valve through a flow meter and a flash vaporizer to the catalyst bed arranged in a 15/16" I.D. electrically heated tube. The reactor exit gases are led to a cooled receiver where the product is collected and subsequently analyzed. The results of seven runs, with temperatures varying from 100° C. to 300° C. at a space velocity of 10 volumes of reactant per volume of catalyst per hour, are summarized in Table VI below:

TABLE VI

| Ex. No. | Feed stock | Temp., ° C. | Space velocity per hour | Mole percent conversion of feed stock to — | |
|---|---|---|---|---|---|
| | | | | $CF_3CCl_3$ | $C_2Cl_2F_4$ |
| 28 | $CF_2ClCFCl_2 + CF_3CCl_3$ | 100 | 10 | 0 | 39 |
| 29 | $CF_2ClCFCl_2 + CF_3CCl_3$ | 200 | 10 | 0 | 49 |
| 30 | $CF_2ClCFCl_2$ | 100 | 10 | 0 | 1 |
| 31 | $CF_2ClCFCl_2$ | 200 | 10 | 0 | 12 |
| 32 | $CF_2ClCFCl_2$ | 300 | 10 | 4 | 39 |
| 33 | $CF_3CCl_3$ | 200 | 10 | | 3 |
| 34 | $CF_3CCl_3$ | 300 | 10 | | 13 |

The above examples show the chromia modified activated alumina produces a catalyst which is quite inactive for the rearrangement of $CF_2ClCFCl_2$ to $CF_3CCl_3$ in contrast to similar catalysts prepared from substantially unmodified activated alumina (compare Examples 1 to 13). The chromia modified catalyst employed in these examples does, however, display activity in the disproportionation of $CF_2ClCFCl_2$, $CF_3CCl_3$ and mixtures of these two isomers to $C_2Cl_2F_4$ as shown by the data in Table VI.

It is to be understood that many other variations and embodiments are included within the scope of the invention in addition to those specifically described above; the embodiments described are for the purpose of illustrating and exemplifying the invention and the invention is not limited thereto.

We claim:

1. A method for converting perfluorochloroethane starting materials into perhalogenated ethane products of a different type than the starting materials which comprises the step of contacting a perfluorochloroethane having at least one fluorine atom and at least one chlorine atom at a temperature between 150° C. and 600° C. with a catalyst prepared by reacting activated alumina with a lower fluorocarbon having not more than 1 hydrogen atom, said reaction being carried out by contacting vapors of said fluorocarbon with activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloroethanes into perhalogenated ethane products of a different type.

2. A method in accordance with claim 1 in which said starting perfluorochloroethane is one having the formula $C_2F_3Cl_3$.

3. A method in accordance with claim 1 in which said perfluorochloroethane starting material is one having the formula $C_2F_4Cl_2$.

4. A method in accordance with claim 1 in which said perfluorochloroethane starting material is $CF_2ClCFCl_2$.

5. A method for converting perfluorochloroethane starting materials into perfluorochloroethane products of a different type than the starting materials which comprises the step of contacting a perfluorochloroethane having at least one fluorine atom and at least two chlorine atoms at a temperature between 225° and 450° C. with a catalyst reacting essentially unmodified activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloroethanes into perfluorochloroethane products of a different type.

6. A method in accordance with claim 5 in which said perfluorochloroethane starting material is one having the formula $C_2F_3Cl_3$.

7. A method in accordance with claim 5 in which said perfluorochloroethane starting material is one having the formula $C_2F_4Cl_2$.

8. A method in accordance with claim 5 in which said perfluorochloroethane starting material is $CF_2ClCFCl_2$.

9. A method in accordance with claim 5 in which said catalyst is periodically regenerated by treatment with an oxygen containing gas at a temperature sufficient to oxidize carbon deposited on said catalyst.

10. A method in accordance with claim 5 in which the perfluorochloroethane starting material is employed in the treatment of said activated alumina to prepare said catalyst.

11. A method for rearranging $CF_2ClCFCl_2$ to $CF_3CCl_3$ comprising the step of contacting said $CF_2ClCFCl_2$ at a temperature between 150 and 600° C. with a catalyst reacting essentially unmodified activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloroethanes into perfluorochloroethane products of a different type.

12. A method in accordance with claim 11 in which said $CF_2ClCFCl_2$ is contacted with said catalyst at a temperature between 225° C. and 450° C.

13. A method for rearranging $CF_2ClCF_2Cl$ to $CF_3CFCl_2$ which comprises the step of contacting said $CF_2ClCF_2Cl$ at a temperature between 150 and 600° C. with a catalyst reacting essentially unmodified activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloroethanes into perfluorochloroethane products of a different type.

14. A method in accordance with claim 13 in which said $CF_2ClCF_2Cl$ is contacted with said catalyst at a temperature between 225° to 450° C.

15. A method for disproportionating a compound of the formula $C_2F_3Cl_3$ to a compound of the formula $C_2F_4Cl_2$ which comprises the step of contacting said $C_2F_3Cl_3$ at a temperature between 150 and 600° C. with a catalyst prepared by reacting essentially unmodified activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloroethanes into perfluorochloroethane products of a different type.

16. A method in accordance with claim 15 in which said $C_2F_3Cl_3$ is contacted with said catalyst at a temperature between about 225° C. and 450° C.

17. A method for disproportionating compounds of the formula $C_2F_4Cl_2$ to compounds of the formula $C_2F_5Cl$ which comprises the step of contacting said $C_2F_4Cl_2$ at a temperature between about 150° to 600° C. with a catalyst reacting essentially unmodified activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloroethanes into perfluorochloroethane products of a different type.

18. A method in accordance with claim 17 in which said $C_2F_4Cl_2$ is contacted with said catalyst at a temperature of from 225° to 450° C.

19. A method for simultaneously disproportionating and rearranging the compound $CF_2ClCFCl_2$ which comprises the step of contacting $CF_2ClCFCl_2$ at a temperature of from 150° to 600° C. with a catalyst reacting essentially unmodified activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloroethanes into perfluorochloroethane products of a different type.

20. A method in accordance with claim 19 in which said $CF_2ClCFCl_2$ is contacted with said catalyst at a temperature of from 225° to 450° C.

21. A method for converting perfluorochloroethane starting materials into perfluorochloroethane products of a different type than the starting materials which comprises the step of contacting a perfluorochloroethane having at least 2 fluorine atoms and at least 2 chlorine atoms at a temperature between 150° C. and 600° C. with a catalyst prepared by reacting essentially unmodified activated alumina with a lower perfluorochloroalkane, said reaction being carried out by contacting vapors of said perfluorochloroalkane with activated alumina at a temperature of the order of 200° C. to 800° C. sufficiently high to initiate an exothermic reaction between said perfluorochloroalkane and said alumina in the course of which reaction said perfluorochloroalkane is converted to carbon oxide and said alumina increases in weight due to the association of fluorine derived from said perfluorochloroalkane therewith, said contacting and the reaction between said perfluorochloroalkane and said alumina being continued until the evolution of carbon oxide substantially ceases, whereupon the thus treated alumina is an active catalyst for the conversion of perfluorochloroethane starting materials into perfluorochloroethane products of a different type.

22. A method in accordance with claim 21 in which said perfluorochloroethane is contacted with said catalyst at a temperature between 225° C. and 450° C.

23. A method in accordance with claim 22 in which said perfluorochloroethane starting material is one having the formula $C_2F_3Cl_3$.

24. A method in accordance with claim 22 in which said perfluorochloroethane starting material is one having the formula $C_2F_4Cl_2$.

References Cited in the file of this patent

UNITED STATES PATENTS

| | | |
|---|---|---|
| 1,994,035 | Croco | Mar. 12, 1935 |
| 2,637,748 | Miller | May 5, 1953 |
| 2,670,388 | Miller et al. | Feb. 23, 1954 |
| 2,676,996 | Miller et al. | Apr. 27, 1954 |
| 2,694,739 | Pailthorp | Nov. 16, 1954 |
| 2,946,828 | Scherer et al. | July 26, 1960 |

UNITED STATES PATENT OFFICE
CERTIFICATE OF CORRECTION

Patent No. 3,087,974

April 30, 1963

Murray Hauptschein et al.

It is hereby certified that error appears in the above numbered patent requiring correction and that the said Letters Patent should read as corrected below.

Column 1, line 55, for "perfluorochlorochane" read -- perfluorochloroethane --; lines 57 and 63, for "cataylst", each occurrence, read -- catalyst --; line 71, for "dioxides" read -- oxides --; column 2, line 6, for "cataylst" read -- catalyst --; line 9, for "are" read -- area --; column 8, line 13, for "C$_2$C" read -- C$_2$Cl$_6$ --; column 10, line 9, strike out "in", first occurrence; line 14, for "produce" read -- product --; columns 9 and 10, Table I, under the column heading "C$_2$Cl$_6$", second entry, for "0.1" read -- 1.0 --; column 10, line 62, for "of", third occurrence, read -- to --; column 12, line 10, for "CF$_2$CCl$_3$)" read -- CF$_3$CCl$_3$) --; line 62, for "C$_2$Cl$_3$F$_4$" read -- C$_2$Cl$_2$F$_4$ --; column 13, line 1, for "with" read -- what --; column 12, lines 2, 38 and 63, column 17, line 40, and column 13, line 1, after "catalyst", each occurrence, insert -- prepared by --.

Signed and sealed this 3rd day of December 1963.

(SEAL)
Attest:
ERNEST W. SWIDER

Attesting Officer

EDWIN L. REYNOLDS
Acting Commissioner of Patents